United States Patent
O'Keeffe et al.

(10) Patent No.: US 8,134,533 B2
(45) Date of Patent: *Mar. 13, 2012

(54) MOUSE WITH INTEGRATED KEYPLATE AND HOUSING

(75) Inventors: Denis O'Keeffe, Newmarket (IE); Neil O'Connell, Cork (IE)

(73) Assignee: Logitech Europe S.A., Morges (CH)

( * ) Notice: Subject to any disclaimer, the term of this patent is extended or adjusted under 35 U.S.C. 154(b) by 610 days.

This patent is subject to a terminal disclaimer.

(21) Appl. No.: 11/365,095

(22) Filed: Feb. 28, 2006

(65) Prior Publication Data

US 2006/0146025 A1 Jul. 6, 2006

Related U.S. Application Data

(63) Continuation of application No. 09/978,306, filed on Oct. 15, 2001, now Pat. No. 7,030,857.

(51) Int. Cl.
*G09G 5/08* (2006.01)
(52) U.S. Cl. ........... 345/163; 345/157; 345/184; 463/37
(58) Field of Classification Search .......... 345/156–169, 345/184; 463/37, 38; D14/402–410
See application file for complete search history.

(56) References Cited

U.S. PATENT DOCUMENTS

| | | | | |
|---|---|---|---|---|
| 5,585,823 A * | 12/1996 | Duchon et al. | ................ | 345/163 |
| 5,717,427 A * | 2/1998 | Lin | ................ | 345/163 |
| 5,717,610 A * | 2/1998 | Baba | ................ | 702/150 |
| 6,099,929 A * | 8/2000 | Chinen | ................ | 428/40.1 |
| 6,256,011 B1 * | 7/2001 | Culver | ................ | 345/157 |
| 6,323,843 B2 * | 11/2001 | Giles et al. | ................ | 345/163 |
| 6,373,467 B1 * | 4/2002 | Slowinski et al. | ................ | 345/163 |
| 6,400,356 B1 * | 6/2002 | Bidiville et al. | ................ | 345/163 |
| 6,452,586 B1 * | 9/2002 | Holmdahl et al. | ................ | 345/163 |
| 6,469,693 B1 * | 10/2002 | Chiang et al. | ................ | 345/163 |
| 6,525,306 B1 | 2/2003 | Bohn | | |
| 6,677,930 B2 | 1/2004 | Nakamura et al. | | |
| 6,791,533 B2 * | 9/2004 | Su | ................ | 345/163 |
| 6,798,397 B2 | 9/2004 | O'Keeffe et al. | | |
| 6,844,873 B2 * | 1/2005 | Johnson | ................ | 345/163 |
| 6,970,156 B1 * | 11/2005 | Silverstein | ................ | 345/163 |
| 7,030,857 B2 * | 4/2006 | O'Keeffe et al. | ................ | 345/163 |
| 2002/0005835 A1 | 1/2002 | Florence et al. | | |
| 2002/0118174 A1 | 8/2002 | Rodgers | | |
| 2003/0006965 A1 | 1/2003 | Bohn | | |

FOREIGN PATENT DOCUMENTS

DE 29813256 U1 11/1998

(Continued)

OTHER PUBLICATIONS

Notice of Allowance for U.S. Appl. No. 09/978,306 mailed on Nov. 16, 2005 9 pages. (Copy available to the Examiner via PAIR).

(Continued)

*Primary Examiner* — Lun-Yi Lao
*Assistant Examiner* — Tom V Sheng
(74) *Attorney, Agent, or Firm* — Kilpatrick Townsend & Stockton LLP

(57) ABSTRACT

An input device, such as a mouse or trackball, with a top housing having an integrally formed, free extending top button. The top housing is mounted so that the extending button is supported in cantilevered fashion. The button is sufficiently flexible to allow it to be depressed for button activation.

21 Claims, 7 Drawing Sheets

FOREIGN PATENT DOCUMENTS

| | | |
|---|---|---|
| EP | 0721170 A1 | 7/1996 |
| EP | 0757327 A2 | 2/1997 |

OTHER PUBLICATIONS

Non Final Office Action for U.S. Appl. No. 09/978,306 mailed on Mar. 18, 2005; 13 pages. (Copy available to the Examiner via PAIR).

Non Final Office Action for U.S. Appl. No. 09/978,306 mailed on Jul. 8, 2004; 12 pages. (Copy available to the Examiner via PAIR).

Non Final Office Action for U.S. Appl. No. 09/978,306 mailed on Feb. 23, 2004; 9 pages. (Copy available to the Examiner via PAIR).

Non Final Office Action for U.S. Appl. No. 09/978,306 mailed on Jul. 30, 2003; 10 pages. (Copy available to the Examiner via PAIR).

* cited by examiner

MOUSE WITH INTEGRATED KEYPLATE AND HOUSING

CROSS-REFERENCE TO RELATED APPLICATION

This application is a continuation of and claims priority from U.S. patent application Ser. No. 09/978,306, filed Oct. 15, 2001 now U.S. Pat. No. 7,030,857, titled "Mouse with Integrated Keyplate and Housing," of Denis O'keeffe et al.

BACKGROUND OF THE INVENTION

The present invention relates to computer mice or track balls, and in particular to buttons on such devices.

In one type of computer mouse, a ball protrudes from the bottom of the mouse housing, and rolls across a supporting surface. The movement of the ball is typically detected by shafts which are in contact with the ball and turn an encoder wheel having a number of slots. Track balls will have a ball mounted on the top with the housing being stationary, but similarly operate with two encoder wheels at 90° angles to detect X and Y movement. Optical mice and trackballs have also been developed.

Such mice and track balls typically also have buttons which can be depressed or clicked by a user, and which depress a switch (microswitch, pancake, optical, etc.). These provide additional inputs to the computer, in addition to the position of the mouse or trackball. Some mouse designs have added a roller or wheel which can be used for such functions as scrolling or zooming. The roller is operated by a user finger much like a dial on a radio.

A button is typically formed by one or more plastic keyplates, which attach to the underside of the top housing of the mouse or trackball. The keyplate covers a part of the mouse, and there is a gap between the keyplate and the rest of the top housing, or adjacent keys. Beneath the keyplate, inside the device, a microswitch is mounted to be activated when the keyplate is depressed.

BRIEF SUMMARY OF THE INVENTION

The present invention provides an input device with a top housing having an integrally formed, free extending top button. The top housing is mounted so that the extending button is supported in cantilevered fashion. The button is sufficiently flexible to allow it to be depressed for button activation.

In one embodiment, the device is a mouse. The top housing and button are formed of a single piece of metal. The metal is a flat piece, bent around the back of the mouse to secure it. The design eliminates the need for any features on the metal, making it easy to manufacture and giving it a clean appearance. An island separates two buttons at the front of the mouse. A roller extends through a slot in the island. The island includes lips which overlap the edges of the buttons, so that no gap is visible from above, giving the mouse a clean look.

In one embodiment, an interior non-metalic housing isolates the metal top housing from the interior electrical components. Inside the interior housing are cantilevered arms for actuating buttons in response to the metal buttons or roller being pressed. When a metal housing button is depressed, it presses down on an actuator pip extending through the interior housing, causing the arm to depress a microswitch mounted on a circuit board beneath the arm.

For a further understanding of the nature and advantages of the invention, reference should be made to the following description taken in conjunction with the accompanying drawings.

DETAILED DESCRIPTION OF THE INVENTION

Figure 1:
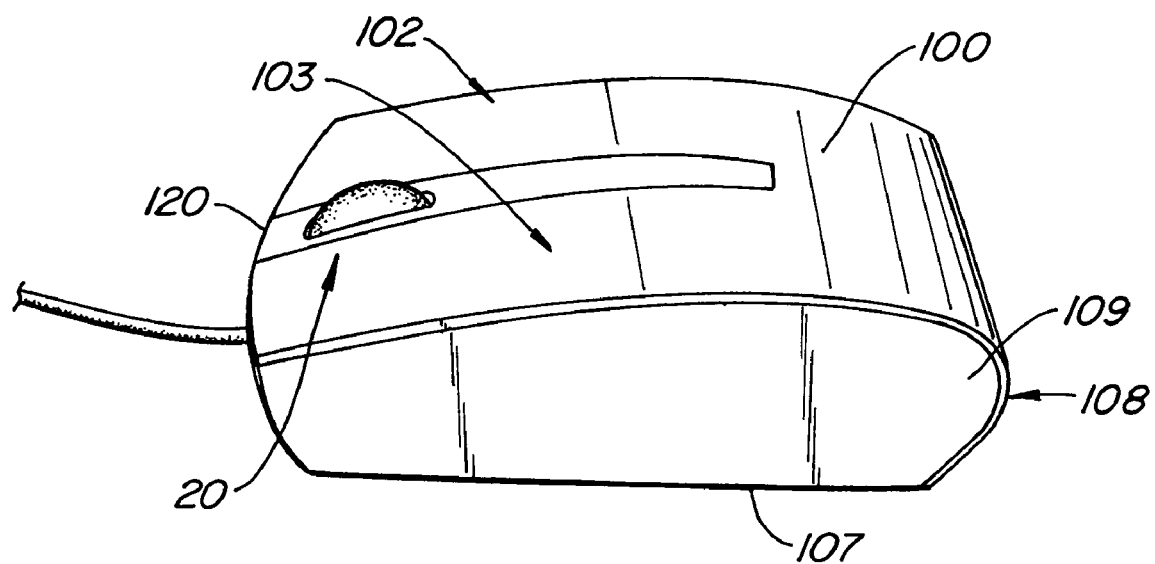
FIG. 1 is a perspective view of an embodiment of the top housing of the invention mounted on a mouse.

FIG. 1 is a perspective view of one embodiment of a mouse according to the present invention. The mouse has a top, exterior metallic housing 100. The metallic top housing 100 is mounted over a mouse body 107. The housing 100 has two extending buttons 102 and 103, which extend on either side of a island 120 mounted on body 107. A roller 20 extends through island 120. Metal housing 100 has a rear, curved portion 108 which wraps around the back of the mouse. Inside curved portion 108 is a rubber bumper 109 to provide additional impact protection so the mouse can pass a drop test. The metal top housing is flexible, and is secured only toward the back of the mouse. Thus, buttons 102 and 103 are free to be depressed, to actuate switches inside mouse body 107. This structure allows a simple metal top housing that is smooth, without requiring any features to be formed in it, as in prior art keyplates. It has a clean, streamlined look, and no gap is visible between the buttons 102, 103 and the island 120 because the island has lips extending over the buttons, as will be more clearly shown insubsequent figures.

Figure 2:
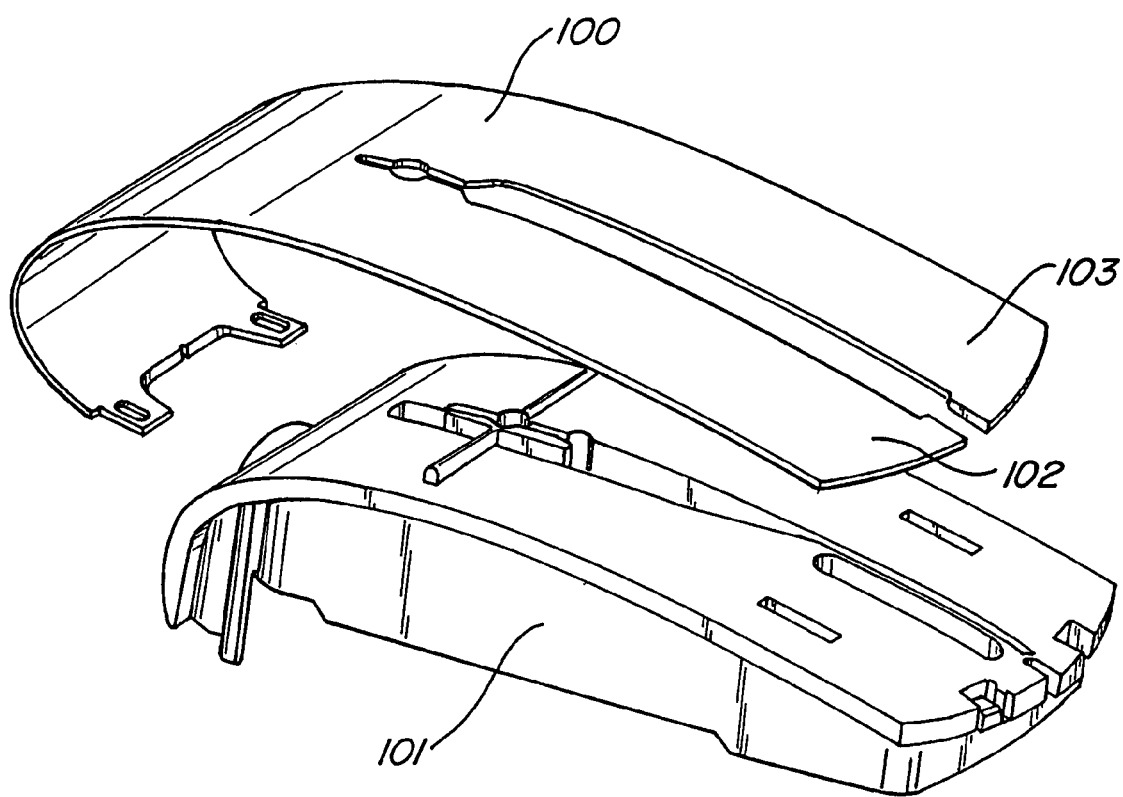
FIG. 2 is an exploded view of the top interior housing and the metallic exterior housing functioning as a button.
Figure 3:
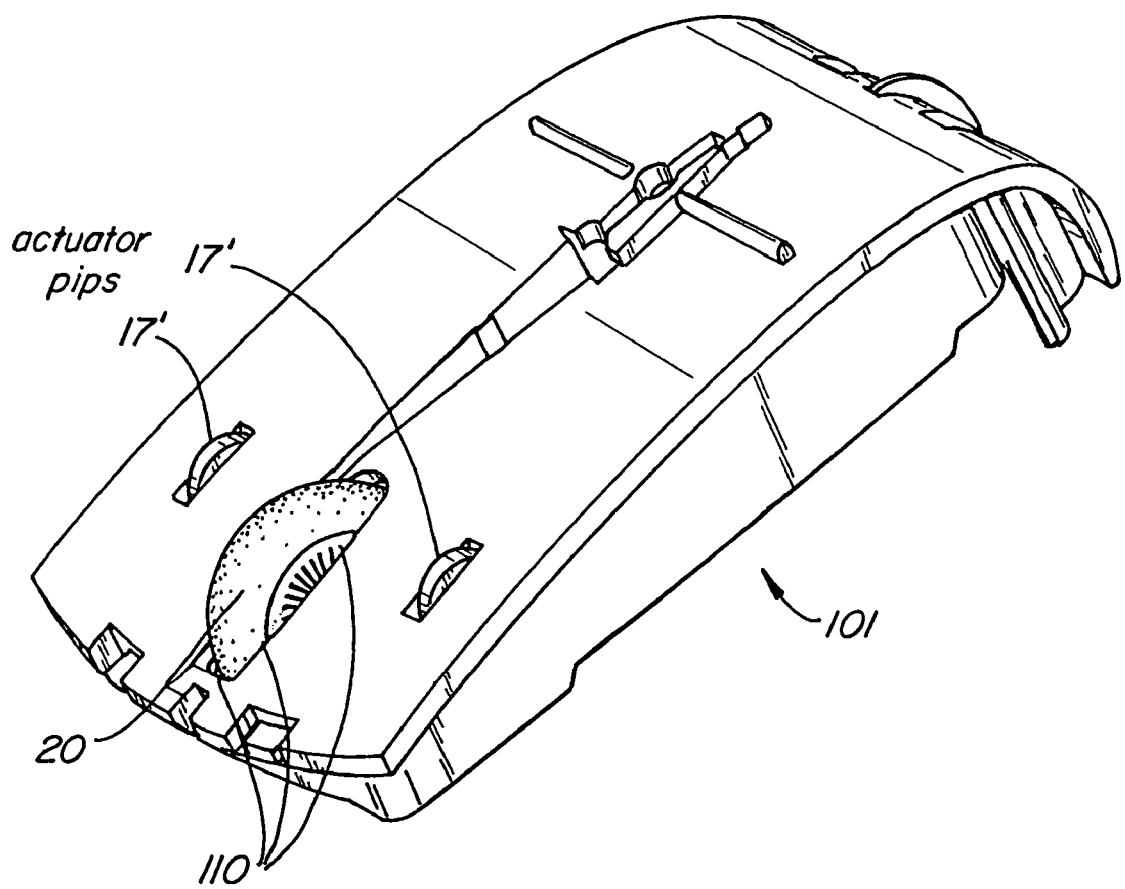
FIG. 3 is an exterior view of the top interior housing.

FIG. 2 shows an exploded view of a top interior housing 101 and the metallic exterior housing 100. As can be seen better here, buttons 102 and 103 extend from the top housing, and are free floating, with the housing only being anchored at the rear of the mouse. FIG. 2 also shows slots 107 and 107' in the top interior housing 101, through which actuator pips extend as shown in FIG. 3, below, to actuate the microswitches. When the metal housing 100 is depressed, it presses down on a actuator pips extending through the slots 107 and 107' in the top housing 101, and causing the arm to depress a microswitch mounted on a circuit board beneath the arm.

FIG. 3 illustrates the exterior appearance of the top interior housing 101. Roller 20 extends through the slot 110 of the top interior housing. Tabs (actuator pips) 17, 17' on an interior cantilevered arm (shown below) for each button also extends through the slot of the top interior housing 101. When a metal housing mounted over the interior top housing is depressed, it presses down on a actuator pips 17 and 17' and causes the arm to depress a microswitch mounted on a circuit board beneath the arm.

Figure 4:
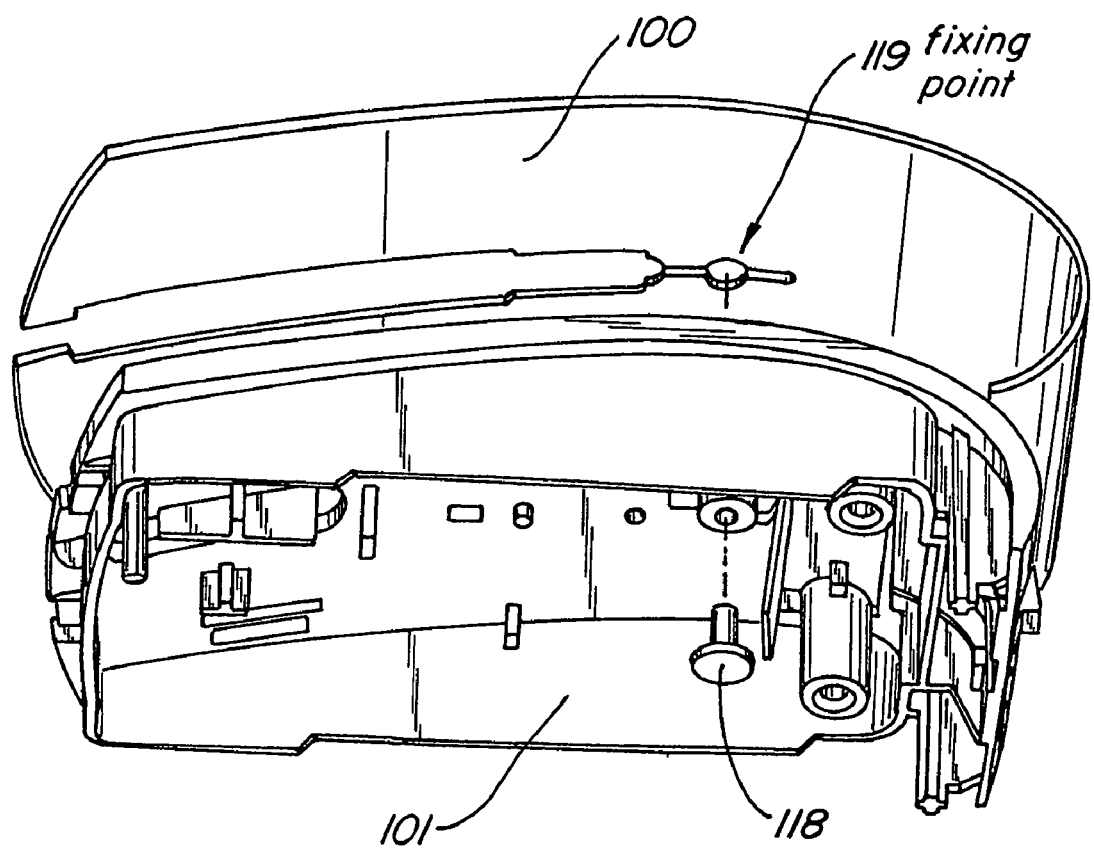
FIG. 4 is an exploded view of the top interior housing and the metallic exterior housing with a single fixing point for attaching the exterior housing to the top interior housing.

FIG. 4 shows another view from the bottom of the metal exterior housing 100 functioning as a button mounted over the top interior housing 101. The button 100 is attached to the interior housing 101 at one fixing point 119 only. This is shown with a screw or other fastener 118 attaching to fixing point hole 119. Alternately, a press fit against an overhanging ledge of island 120 could be used, or any other form of attachment. In addition, the back of the metal housing wraps around and press-fits, snap attaches, or is loosely located against the back of the mouse. This provides a pivot point for the depression of the front button portions 102, 103 of the metal housing. It also allows flexion of the back, curved portion to provide a distribution of impact forces in a drop test to avoid damage to the internal components of the mouse. Fixing at point 119 and loose location at the back allows flexion of the curved portion which also reduces the overall force required by the user to activate the key.

Figure 5:
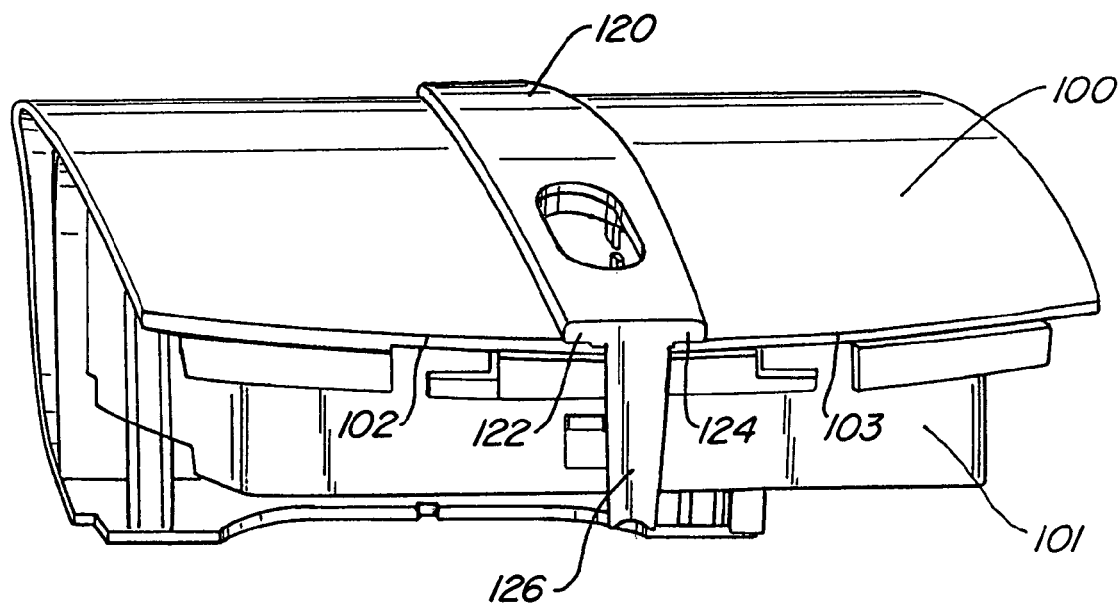
FIG. 5 is an exterior view of the metallic top housing with the roller removed.

FIG. 5 shows a front exterior view of the metallic top housing 100 with the roller removed. The actuator pips shown in FIG. 3 are hidden by the exterior top housing 100. The island 120 has ledges or lips 122 and 124 which extend over the edges of buttons 102 and 103. This elimates any visible gap from above, giving a clean, streamlined look to the mouse. In addition, ledges 122 and 124 limit the upward travel of the buttons 102 and 103, which are mounted so that their flexion biases them up against the underside of ledges 122 and 124 when the buttons aren't depressed. Alternately, there may be no upward force against the underside of the ledges. This provides a stop for upward travel of the buttons, again simplifying the design compared to prior art keyplates.

Figure 6:
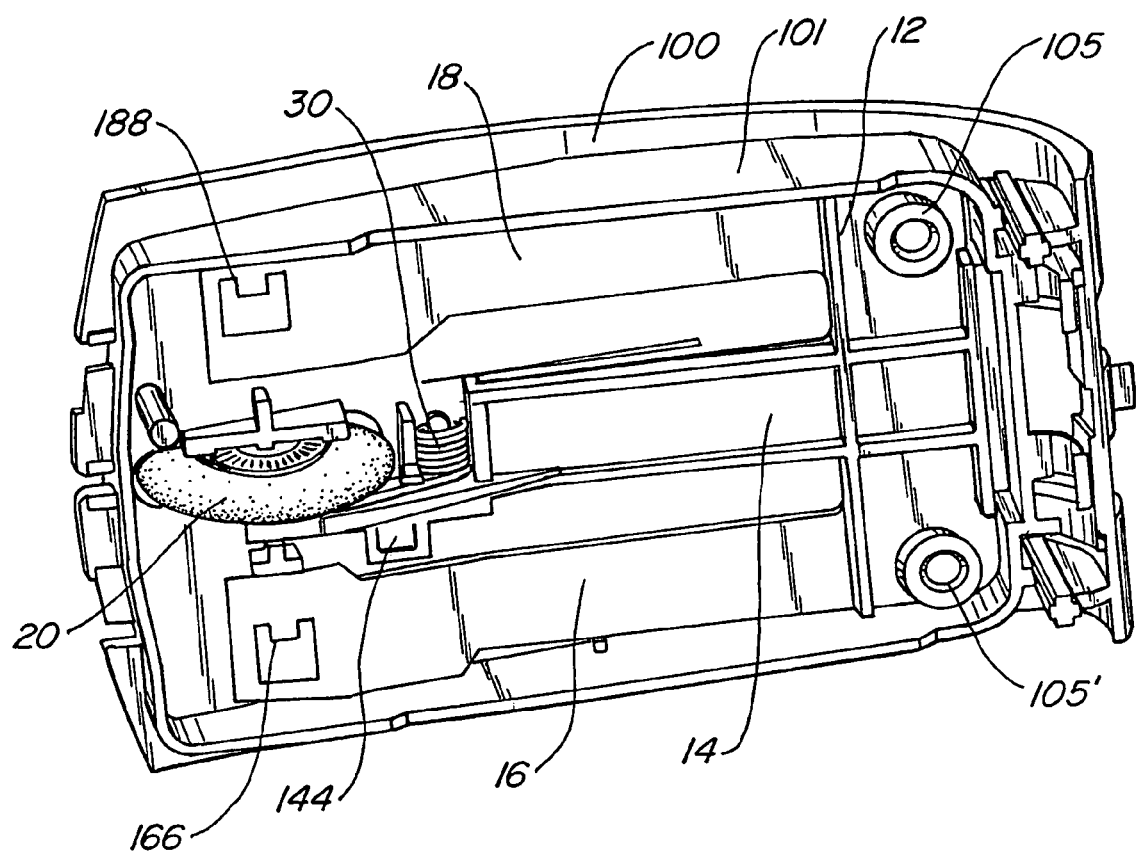
FIG. 6 is a perspective view of the underside of the exterior housing, top interior housing, cantilevered arm and roller of one embodiment of the invention.

FIG. 6 is a perspective view of the underside of exterior housing 100 and top interior housing 101 with an internal plastic keyplate 12 mounted on the top interior housing according to one embodiment of the invention. The exterior housing 100 is preferably made of metal, and acts as two buttons in addition to functioning as the exterior housing. The top interior housing 101 has two pegs 105, 105' proximate the rear of the top housing. The pegs snap fit into the keyplate to attach the keyplate to the interior housing by engaging two sockets 15 in internal keyplate 12. The pegs are loosely located in the keyplate to avoid the metal popping out in a drop test. The loose location has a benefit of providing the drop test assistance and not requiring precise tolerances. The internal keyplate 12 is formed of three cantilevered arms 14, 16, and 18. The ends of the side arms 16 and 18 serve as side buttons 166 and 188 (left and right click buttons) when depressed by a user finger on the corresponding button portion of exterior housing 100. The cantilevered arms 14, 16, and 18 are formed of an integral piece of plastic and are connected proximate the rear of the keyplate 12 and the top housing 100.

Middle cantilevered arm 14 supports a roller 20 attached on the end of the arm 14, proximate the front of the plate 12 and the top housing. The middle arm 14 has a protrusion 144 that serves to activate an underlying microswitch when the roller is depressed. The arm 14 has a spring force to bias the roller upward, eliminating the need for a return spring, in contrast with a typical prior art mouse that has a complex support structure for a roller mounted on the bottom housing and that needs a lift spring to bias the roller upward.

The interior plastic housing provides insulation for the mouse. The use of a metal exterior housing presents issues with electrostatic discharge (ESD) harming the internal electronic components. The use of the interior plastic housing isolates the metal top housing from the internal components. The uses of the interior cantilevered plastic arms isolates the metal buttons from the internal microswitches. The interior housing also provides a stop for downward travel of the metal buttons.

Figure 7:
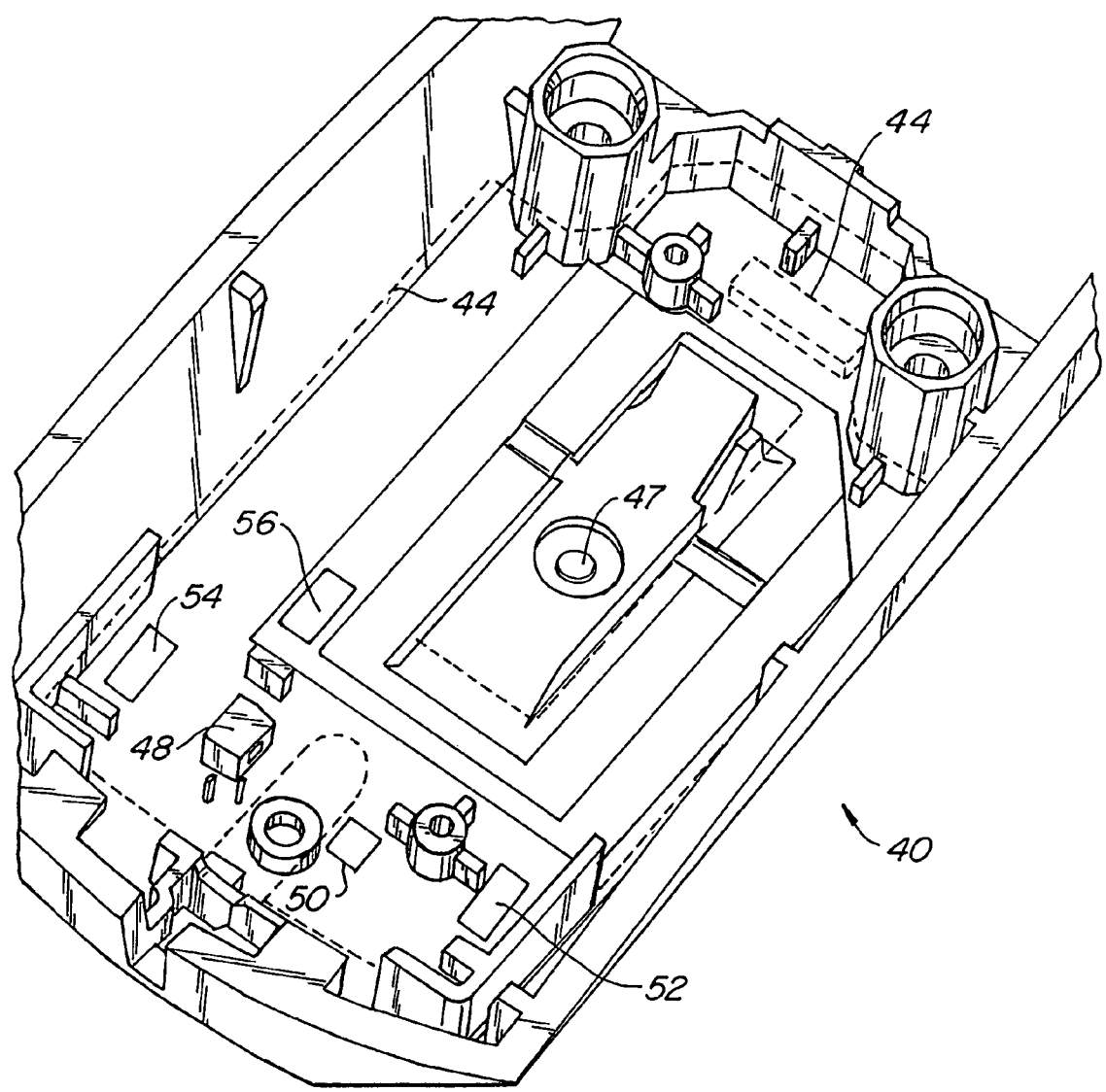
FIG. 7 is a perspective view of the bottom portion of the body of the mouse showing the circuit board placement and an insulating and ESD protecting membrane around an optical element.

FIG. 7 illustrates the layout of a printed circuit board (PCB) 44, outlined in phantom, and mounted on a lower housing 40 of the mouse. On the printed circuit board is mounted a light emitter, such as a light emitting diode (LED) 48. LED 48 is on one side of the roller, while on the other side, opposite LED 48, is a photo detector 50. As the roller is rotated, the slots 64 alternately block and let light pass from emitter 48 to detector 50.

FIG. 7 also shows microswitches 52 and 54 which are placed beneath the two side buttons 166 and 188 at the end of each of the cantilevered arms 16 and 18 of FIG. 6. In addition, a third switch 56 is provided to be activated by a protrusion 144 on the cantilevered arm 14, that serves as a third button when the roller is depressed, visible in FIG. 6. The microswitches 52, 54 and 56 as well as an optical module 47 are mounted on the circuit board 44.

As will be apparent to those skilled in the art, the present invention may be embodied in other specific forms without departing from the essential characteristics thereof. For example, the exterior top housing functioning as a button could be plastic. Also the exterior top housing could have one or three buttons instead of two. The metalic housing could be mounted on a trackball, with a ball extending through a gap in the metal, and an island on the other side of the ball from the anchoring portion of the metal housing. Accordingly, the foregoing description is intended to be illustrative, but not limiting, of the scope of the invention which is set forth in the following claims.

What is claimed is:

1. An input device comprising:
   a body of said device;
   electronic circuitry mounted in said body;
   a top housing mounted over said body;
   a free extending button integrally formed with said top housing, wherein a top surface of the extending button and a top surface of the top housing are substantially seamlessly coupled;
   said extending button being depressible separately with respect to a remainder of said top housing;
   said top housing providing a cantilevered mounting of said extending button to said body of said device; and
   an island mounted on said body between said extending buttons, said island having lips extending over edges of said extending buttons so that a gap between said extending buttons and said island is not visible from above.

2. The input device of claim 1 wherein the top housing and extending button portion are metal.

3. The input device of claim 1 further comprising a second extending button, said second extending button extending underneath a second lip on a side of said island opposite said first mentioned extending button.

4. The input device of claim 1 further comprising a roller extending through a slot in said island.

5. The input device of claim 4 further comprising:
   a cantilevered arm supporting the roller and attached to an inside surface of the top housing behind the roller, wherein the cantilevered arm provides a spring force to bias roller upward through the slot, eliminating the need for a return spring.

6. The input device of claim 1 wherein said top housing curves around a back of said device and attaches to said back of said device.

7. The input device of claim 6 further comprising a resilient bumper mounted between said top housing and said body where said top housing curves around said back of said device.

8. The input device of claim 1 further comprising:
a non-metallic interior housing mounted beneath said top housing between said top housing and electronic circuitry inside said device;
wherein said top housing is metal, and said interior housing isolates said metal from said electronic circuitry.

9. The input device of claim 1 wherein said top housing and extending button have a single hinge point more than halfway toward the back of said device, such that said top housing and extending button can flex on either side of said hinge point.

10. The input device of claim 1 wherein said device is a mouse.

11. A mouse comprising:
a body of said mouse;
electronic circuitry mounted in said body;
a top metal housing mounted over said body;
first and second free extending metal buttons integrally formed with said metal top housing, wherein top surfaces of the first and second extending buttons and a top surface of the top housing are substantially seamlessly coupled;
said extending buttons being depressible separately with respect to a remainder of said top housing;
said top housing providing a cantilevered mounting of said extending buttons to said body of said device; and
an island mounted on said body between said extending buttons, said island having lips extending over edges of said extending buttons so that a gap between said extending buttons and said island is not visible from above.

12. The mouse of claim 11 further comprising a roller extending through a slot in said island.

13. The mouse of claim 12 further comprising:
a cantilevered arm supporting the roller and attached to an inside surface of the top housing behind the roller, wherein the cantilevered arm provides a spring force to bias roller upward through the slot, eliminating the need for a return spring.

14. The input device of claim 11, wherein said top housing curves around a back of said device and attaches to said back of said device.

15. The input device of claim 14, further comprising a resilient bumper mounted between said top housing and said body where said top housing curves around said back of said device.

16. The input device of claim 11, further comprising:
a non-metallic interior housing mounted beneath said top housing between said top housing and electronic circuitry inside said device;
wherein said top housing is metal, and said interior housing isolates said metal from said electronic circuitry.

17. An input device comprising:
a body of said device;
electronic circuitry mounted in said body;
a top housing mounted over said body; and
an extending button integrally formed with said top housing, wherein a top surface of the extending button and a top surface of the top housing are substantially seamlessly coupled; and wherein said extending button is depressible separately with respect to a remainder of said top housing;
wherein said top housing and said extending button have a single hinge point more than halfway toward the back of said device, such that said top housing and extending button can flex on either side of said hinge point.

18. The input device of claim 15, wherein said top housing provides a cantilevered mounting of said extending button to said body of said device.

19. The input device of claim 15, wherein said extending button is a free extending button.

20. The input device of claim 15, wherein the top housing and said extending button are metal.

21. The input device of claim 15, wherein said device is a mouse.

* * * * *